United States Patent
Stanich et al.

(10) Patent No.: US 11,738,552 B2
(45) Date of Patent: Aug. 29, 2023

(54) INK MODEL GENERATION MECHANISM

(71) Applicants: Mikel Stanich, Boulder, CO (US);
Nikita Gurudath, Boulder, CO (US);
Pallavi Premkumar, Boulder, CO (US); Ziling Zhang, Boulder, CO (US);
Burke Larsen, Boulder, CO (US)

(72) Inventors: Mikel Stanich, Boulder, CO (US);
Nikita Gurudath, Boulder, CO (US);
Pallavi Premkumar, Boulder, CO (US); Ziling Zhang, Boulder, CO (US);
Burke Larsen, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 80 days.

(21) Appl. No.: 17/165,291

(22) Filed: Feb. 2, 2021

(65) Prior Publication Data

US 2022/0242110 A1 Aug. 4, 2022

(51) Int. Cl.
*B41J 2/045* (2006.01)
*B41J 2/21* (2006.01)

(52) U.S. Cl.
CPC ......... *B41J 2/04535* (2013.01); *B41J 2/0452* (2013.01); *B41J 2/0454* (2013.01); *B41J 2/04586* (2013.01); *B41J 2/2121* (2013.01)

(58) Field of Classification Search
CPC ...... B41J 2/0453; B41J 2/0452; B41J 2/0454; B41J 2/2121
See application file for complete search history.

(56) References Cited

U.S. PATENT DOCUMENTS

| | | |
|---|---|---|
| 6,484,631 B2 | 11/2002 | Degani et al. |
| 7,423,778 B2 | 9/2008 | Hersch et al. |
| 7,773,256 B2 | 8/2010 | Edge |
| 8,100,057 B2 | 1/2012 | Hartmann et al. |
| 8,322,811 B2 | 12/2012 | Chandu et al. |
| 8,576,450 B2 | 11/2013 | Shepherd et al. |
| 8,705,121 B2 | 4/2014 | Hattenberger |
| 8,734,034 B2 | 5/2014 | Morovic et al. |
| 8,750,512 B2 | 6/2014 | Harkins |
| 8,923,713 B2 | 12/2014 | Terao et al. |
| 9,019,561 B1 | 4/2015 | Sanchez et al. |
| 9,056,485 B2 | 6/2015 | Szafraniec |

(Continued)

FOREIGN PATENT DOCUMENTS

| | | |
|---|---|---|
| CN | 107945097 | 4/2018 |
| DE | 102013113281 | 7/2014 |

(Continued)

OTHER PUBLICATIONS

Notice of Allowance for U.S. Appl. No. 17/165,238, 10 pages, dated Jun. 7, 2022.

(Continued)

*Primary Examiner* — Scott A Richmond
(74) *Attorney, Agent, or Firm* — Jaffery Watson Mendonsa & Hamilton LLP

(57) ABSTRACT

A printing system is disclosed. The printing system includes at least one physical memory device to store drop size logic and one or more processors coupled with the at least one physical memory device to execute the drop size logic to generate drop size data associated with a printing system based on ink deposition data for a print medium and ink drop count data.

16 Claims, 10 Drawing Sheets

(56) References Cited

U.S. PATENT DOCUMENTS

| | | | |
|---|---|---|---|
| 9,096,056 | B2 | 8/2015 | Zhou et al. |
| 9,102,157 | B2 | 8/2015 | Prothon et al. |
| 9,132,629 | B2 | 9/2015 | Ward et al. |
| 9,347,874 | B2 | 5/2016 | Keydar et al. |
| 9,427,963 | B2 | 8/2016 | Clippingdale et al. |
| 9,565,339 | B2 | 2/2017 | Noffke et al. |
| 9,621,762 | B2 | 4/2017 | Chandu et al. |
| 9,643,408 | B1 | 5/2017 | Schweid |
| 9,656,463 | B1 * | 5/2017 | Ernst .............. B41J 2/04581 |
| 9,661,154 | B1 | 5/2017 | Stanich et al. |
| 9,785,873 | B2 | 10/2017 | Stanich et al. |
| 10,129,436 | B2 | 11/2018 | Kimura |
| 10,214,038 | B2 | 2/2019 | Klinger et al. |
| 10,237,452 | B2 | 3/2019 | Rius Rossell et al. |
| 10,338,496 | B2 | 7/2019 | Able et al. |
| 10,549,523 | B2 | 2/2020 | Stanich et al. |
| 11,182,113 | B2 | 11/2021 | Stanich et al. |
| 2003/0179410 | A1 | 9/2003 | Velde |
| 2010/0067936 | A1 | 3/2010 | Kitajima et al. |
| 2013/0101328 | A1 | 4/2013 | Morovic et al. |
| 2013/0176600 | A1 * | 7/2013 | Chandu .............. H04N 1/405 358/3.06 |
| 2013/0222461 | A1 | 8/2013 | Kaszynski |
| 2017/0080732 | A1 | 3/2017 | Kasahara |
| 2017/0118360 | A1 * | 4/2017 | Arnér .............. H04N 1/00503 |
| 2017/0201654 | A1 | 7/2017 | Rossell |
| 2017/0259560 | A1 | 9/2017 | Sreenivasan et al. |
| 2018/0234582 | A1 | 8/2018 | Stanich et al. |
| 2019/0238723 | A1 | 8/2019 | Morovic |
| 2019/0268482 | A1 | 8/2019 | Stanich et al. |
| 2019/0351674 | A1 | 11/2019 | Stritzel |
| 2020/0108621 | A1 | 4/2020 | Ferreri |
| 2021/0271943 | A1 | 9/2021 | Stanich et al. |

FOREIGN PATENT DOCUMENTS

| | | |
|---|---|---|
| EP | 0454448 | 10/1991 |
| EP | 2313272 | 2/2010 |
| JP | 2015054934 | 3/2015 |
| JP | 2018-1751 | 1/2018 |
| JP | 2018174143 | 11/2018 |
| JP | 2020-37238 | 3/2020 |
| WO | 2018022077 | 2/2018 |

OTHER PUBLICATIONS

Bugnon et al., "Calibrating Ink Spreading Curves by Optimal Selection of Tiles from Printed Color Images", vol. 21, Issue 1, paper 013024 (2012), pp. 1-14.

Alamán, J. et al. (Nov. 2016). Inkjet Printing of Functional Materials for Optical and Photonic Applications. Materials 2016, 9(910). doi:10.3390/ma9110910. See highlighted and underlined sections.

U.S. Appl. No. 17/184,821 entitled, "Color Space Ink Model Generation Mechanism", filed Feb. 25, 2021, 45 pages.

U.S. Appl. No. 17/165,238 entitled, "Ink Model Generation Mechanism", filed Feb. 2, 2021, 47 pages.

Rius, M., Casaldàliga, M., Vargas, X. F., Quintero, X., Segura, R., & del Vallès, S. C. (Jan. 2015). Printer Calibrations for HP Large Format Page Wide Technology. In NIP & Digital Fabrication Conference (vol. 2015, No. 1, pp. 326-331). Society for Imaging Sciersce and Technology.

Milder, O. B., Tarasov, D. A., & Titova, M. Y. (Mar. 2017). Inkjet printers linearization using 3D gradation curves. In CEUR Workshop Proceedings. Proceedings of the 1st International Workshop on Radio Electronics & Information Technologies (REIT 2017), Yekaterinburg, Russia (vol. 1814, pp. 74-83).

Jangra, A., Verma, S. & Boora, S. (2017). Identifying the Relationship Between Solid Ink Density and Dot Gain in Digital Printing. International Research Journal of Management Science & Technology, 8(3), 15-20. doi:10.32804/IRJMST. See highlighted and underlined sections.

Park, J., Kim, B., Kim, S. Y., & Hwang, J. (2014). Prediction of drop-on-demand (DOD) pattern size in pulse voltage-applied electrohydrodynamic (EHD) jet printing of Ag colloid ink. Applied Physics A, 117(4), 2225-2234.

Office Action from U.S. Appl. No. 17/686,534, dated Dec. 12, 2022, 15 pages.

* cited by examiner

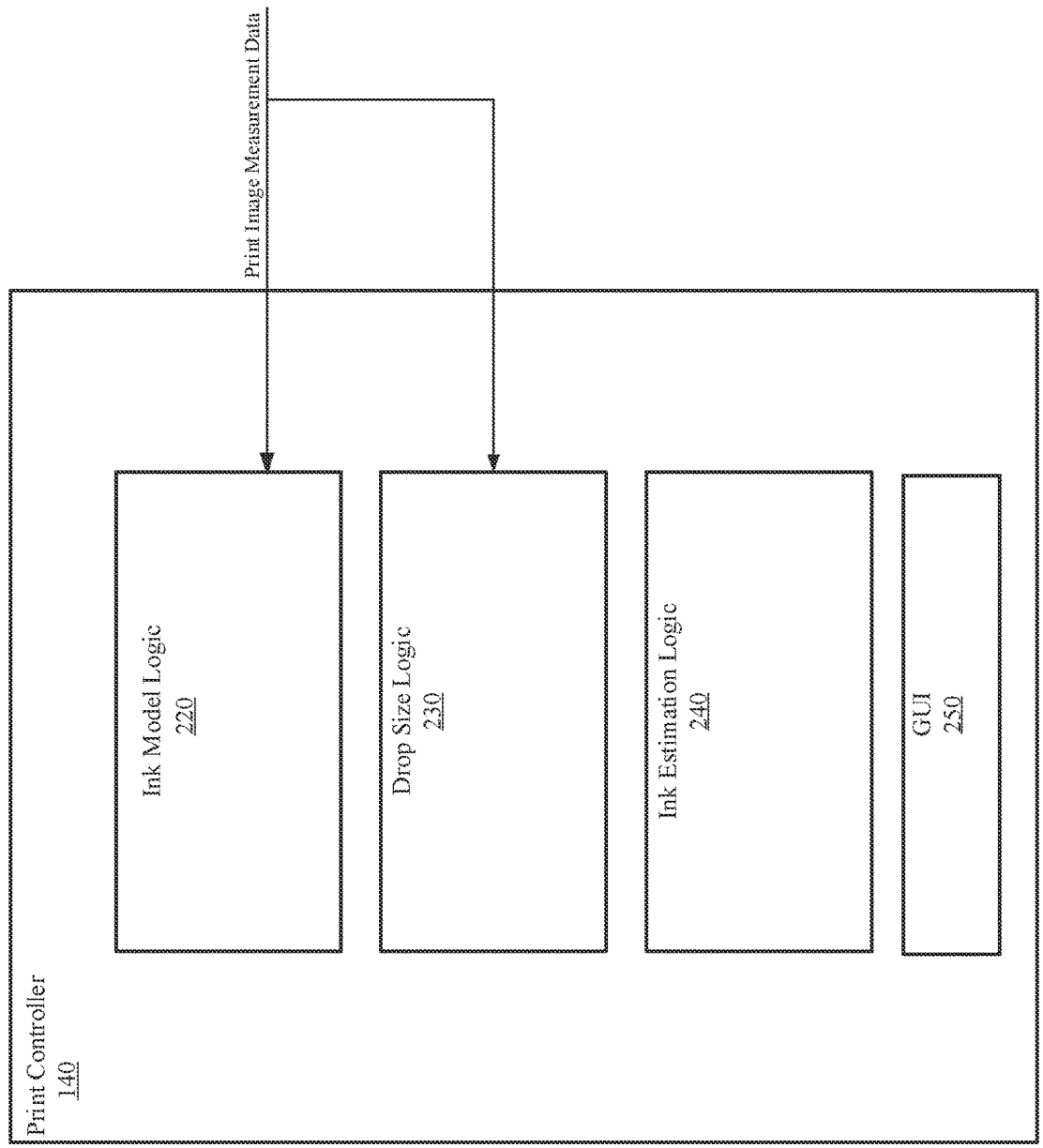

INK MODEL GENERATION MECHANISM

FIELD OF THE INVENTION

The invention relates to the field of printing systems, and in particular, to performing ink usage estimation for a printing system.

BACKGROUND

Some print systems estimate ink usage assuming a constant volume for ink drops ejected from the printhead. However, ink volumes ejected by the printhead tend to vary over time and during printing due to changes in the print environment or conditions of the ink or printhead. Accordingly, ink estimates that assume constant ejection amounts are inaccurate. Determining accurate ink model parameter estimates and computing actual ink drop sizes for a printer are complicated processes that may take large amounts of time to perform.

Performing those determinations typically requires printing a range of print jobs while measuring ink volumes and ink drop counts for each print job. Further, these determinations apply only to the specific print mediums, print settings and printers that are to be evaluated. Because these processes are arduous, efficient mechanisms to determine accurate ink model parameter estimates and computing ink drop sizes are desired.

SUMMARY

In one embodiment, a printing system is disclosed. The printing system includes at least one physical memory device to store drop size logic and one or more processors coupled with at least one physical memory device to execute the drop size logic to generate drop size data associated with a printing system based on ink deposition data for a print medium and ink drop count data.

BRIEF DESCRIPTION OF THE DRAWINGS

A better understanding of the present invention can be obtained from the following detailed description in conjunction with the following drawings, in which:

FIGS. 2A&2B illustrate block diagrams of embodiments of a print controller;

DETAILED DESCRIPTION

A mechanism for determining ink model parameter estimates and using the estimates to compute drop sizes is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
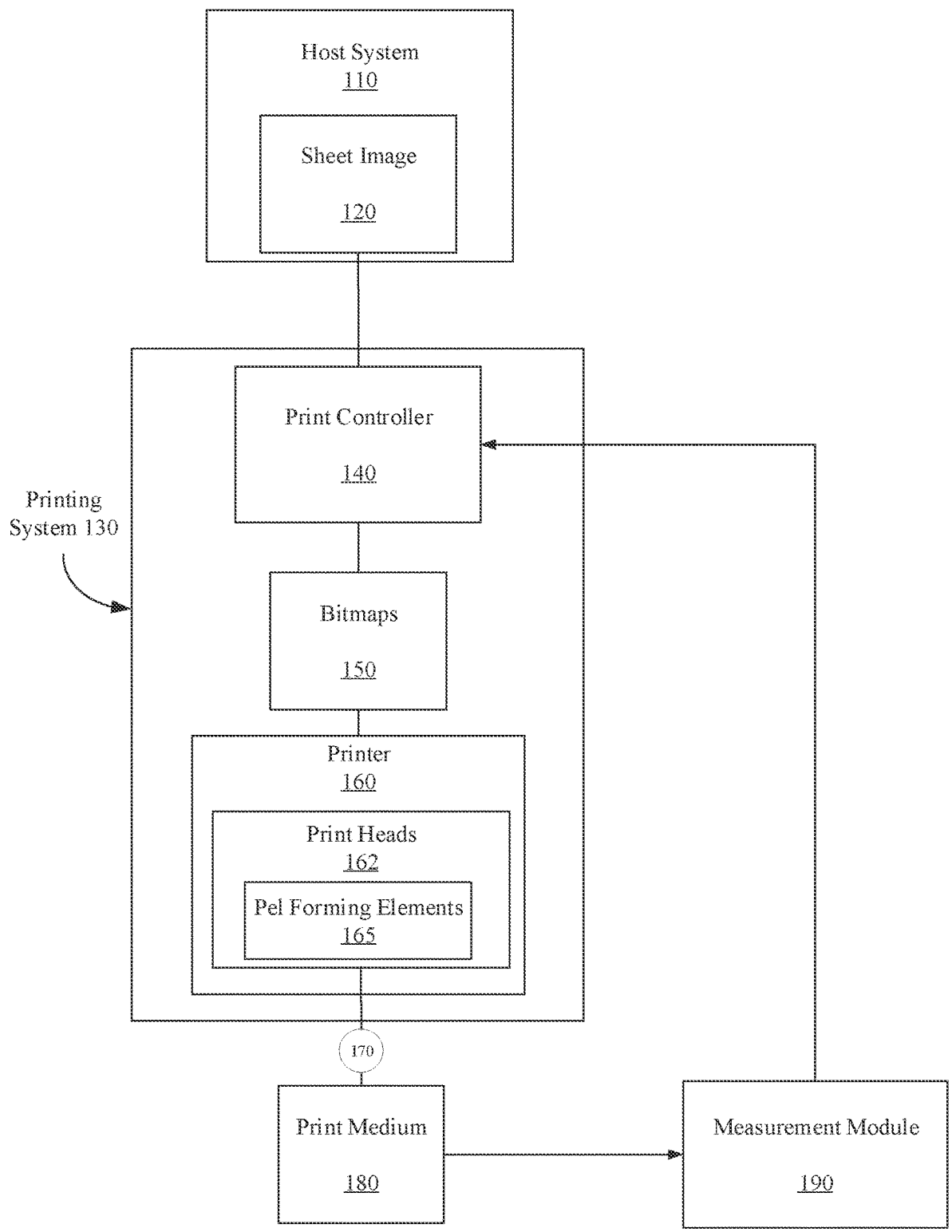
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 via a printer 160 (e.g., print engine). Print medium 180 may include paper, card stock, paper board, corrugated fiberboard, film, plastic, synthetic, textile, glass, composite or any other tangible medium suitable for printing. The format of print medium 180 may be continuous form or cut sheet or any other format suitable for printing. Printer 160 may be an ink jet, electrophotographic or another suitable printer type having a well-defined association with the amount of marking material deposited in each individual printer picture element (pel).

In one embodiment, printer 160 comprises one or more print heads 162, each including one or more pel forming elements 165 that directly or indirectly (e.g., by transfer of marking material through an intermediary) forms the representation of picture elements (pels) on the print medium 180 with marking material (e.g., ink, paint, toner, polymers and other materials suitable for printing) applied (e.g., deposited) to the print medium. In an ink jet printer, the pel forming element 165 is a tangible device (e.g., an ink jet nozzle) that ejects the ink drop 170 (e.g., marking material elements) onto the print medium 180 and, in an electrophotographic (EP) printer the pel forming element may be a tangible device that determines the location of toner particles printed on the print medium (e.g., an EP exposure LED or an EP exposure laser).

The pel forming elements may be grouped onto one or more printheads. The pel forming elements 165 may be stationary (e.g., as part of a stationary printhead) or moving (e.g., as part of a printhead that moves across the print medium 180) as a matter of design choice. The pel forming elements 165 may be assigned to one of one or more color planes that correspond to types of marking materials (e.g., Cyan, Magenta, Yellow, and blacK (CMYK)).

In a further embodiment, printer 160 is a multi-pass printer (e.g., dual pass, 3 pass, 4 pass, etc.) wherein multiple sets of pel forming elements 165 print the same region of the print image on the print medium 180. The set of pel forming elements 165 may be located on the same physical structure (e.g., an array of nozzles on an ink jet print head) or separate physical structures. The resulting print medium 180 may be printed in color and/or in any of a number of gray shades, including black and white (e.g., Cyan, Magenta, Yellow, and blacK, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for transmission. Bitmap 150 may be a halftoned bitmap (e.g., a calibrated halftone bit map generated from calibrated halftones, or uncalibrated halftone bit map generated from uncalibrated halftones) for printing to the print medium 180. The printing system 130 may be a high-speed printer operable to print relatively high volumes (e.g., greater than 100 pages per minute).

The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120. Although shown as a component of printing system 130, other embodiments may feature printer 160 as an independent device communicably coupled to print controller 140.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. In one embodiment, measurement module 190 is implemented as part of ink model and ink drop size systems to obtain measurements of the printed medium 180. The measured results are communicated to print controller 140 to be used to generate ink model parameter data, as well as generate drop size data. The measurement module 190 may be a stand-alone process communicably coupled to printing system 130 or be integrated into the printing system 130.

According to one embodiment, measurement module 190 may be a sensor to take measurements of printed images on print medium 180. Measurement module 190 may generate and transmit print image measurement data. Print image measurement data may be color response (e.g., RGB, optical density, etc.) data corresponding to a printed image that is either raw or processed. In one embodiment, measurement module 190 may comprise one or more sensors that each or in total take measurements for printed markings produced for some or all pel forming elements 165. In-line ink volume sensing devices to monitor the amount (e.g., volume or mass) of ink used for printing is another type of device which may be included in measurement module 190.

In another embodiment, measurement module 190 may be a camera system, in-line scanner, densitometer or spectrophotometer. In a further embodiment, print image measurement data may include map information to correlate portions (e.g., a pel or plurality of pels) of the print image data to the corresponding pel forming elements 165 that produced the portions of the printed images.

Figure 2B:
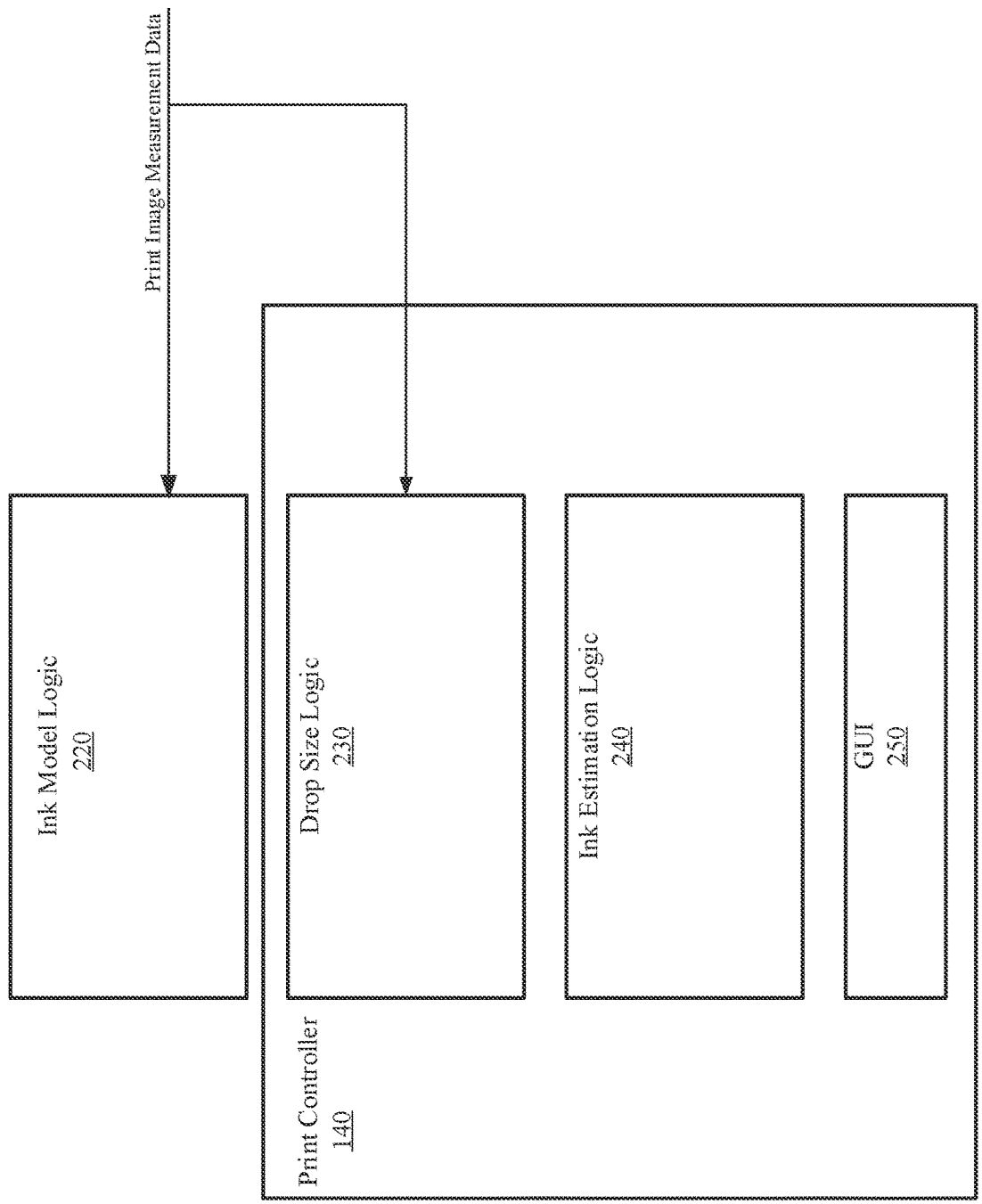

FIGS. 2A&2B illustrate embodiments implementing print controller 140. FIG. 2A illustrates a print controller 140 (e.g., DFE or digital front end), in its generalized form, including ink model logic 220, drop size logic 230, and ink estimation logic 240. FIG. 2B illustrates an embodiment in which print controller 140 includes drop size logic 230 and ink estimation logic 240, while ink model logic 220 are coupled externally. In either embodiment, the separate components may represent hardware used to implement the print controller 140. Alternatively, or additionally, the separate components may represent logical blocks implemented by executing software instructions in a processor of the printer controller 140.

Figure 2C:
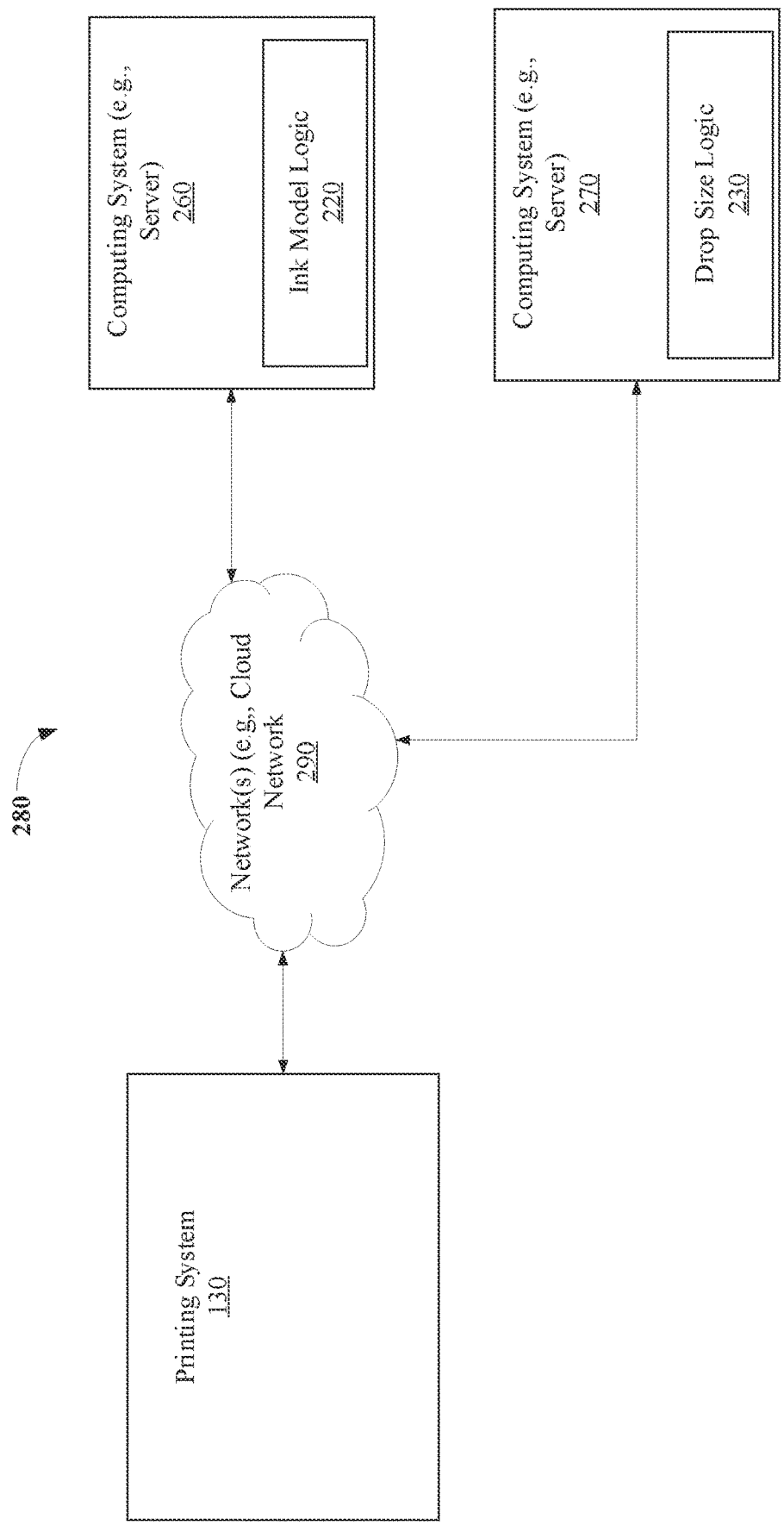
FIG. 2C illustrates another embodiment of an ink model logic and drop size logic implemented in a network.

Although shown as a component within of print controller 140, other embodiments may feature ink model logic 220 and drop size logic 230 included within independent devices, or combination of devices, communicably coupled to print controller 140. For instance, FIG. 2C illustrates one embodiment of ink model logic 220 and drop size logic 230 implemented in a network 280. As shown in FIG. 2C, ink model logic 220 and drop size logic 230 are included within a computing systems 260 and 270, respectively, and transmit data to printing system 130 via a cloud network 290.

According to one embodiment, ink model logic 220 generates ink model parameter data for an unknown print medium based on uncalibrated ink deposition data for a reference print medium and uncalibrated optical density (OD) measurement data for the unknown print medium printed on a print system (e.g., printing system 130). In such an embodiment, the uncalibrated ink deposition data associated with the reference print medium is generated from reference ink model parameter data for the reference print medium and uncalibrated optical density measurement data for the reference print medium.

Figure 3:
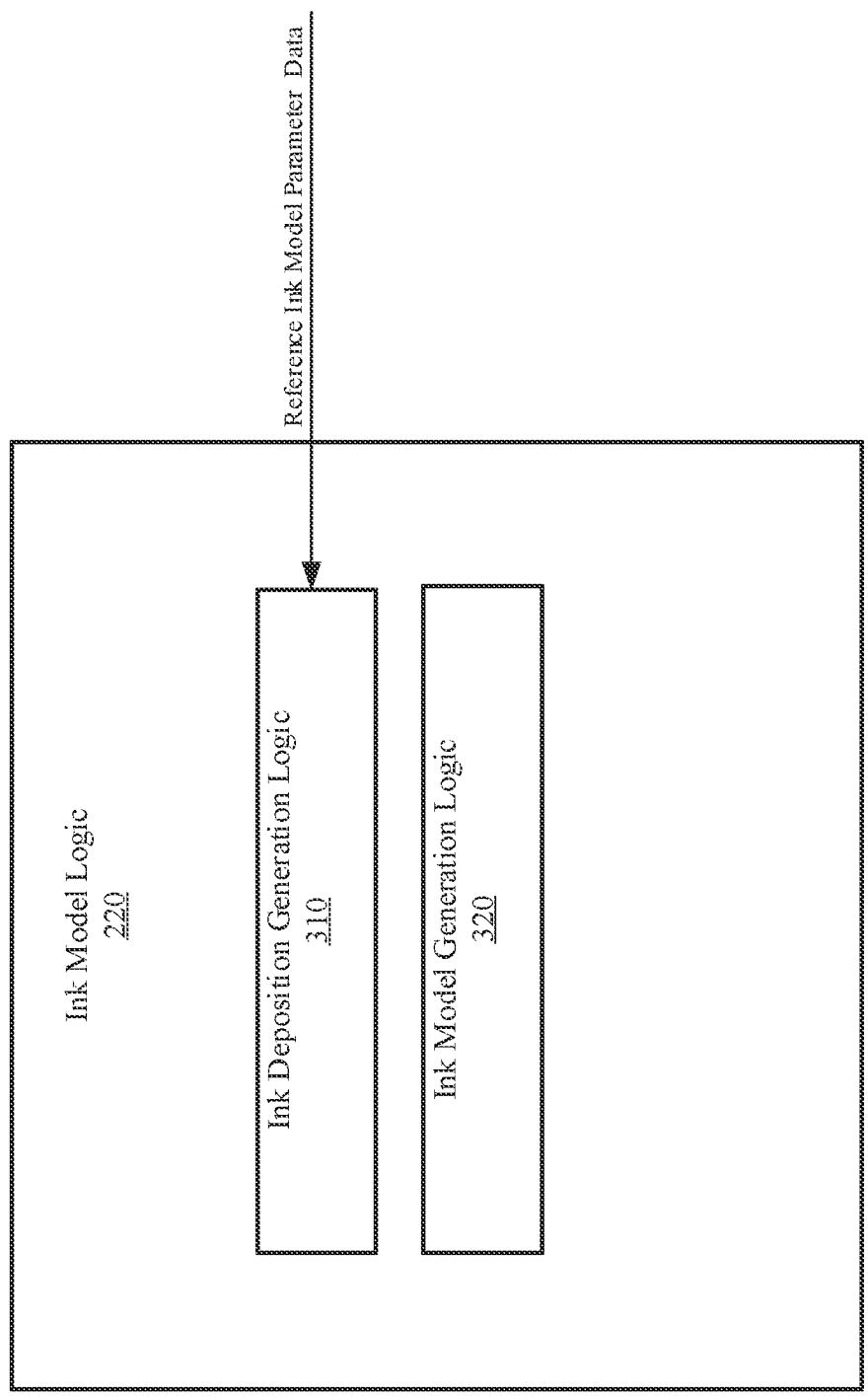
FIG. 3 illustrates one embodiment of ink model logic.

FIG. 3 illustrates one embodiment of ink model logic 220. As shown in FIG. 3, ink model logic 220 includes ink deposition generation logic 310 and ink model generation logic 320. According to one embodiment, ink deposition generation logic 310 generates the uncalibrated ink deposition data associated with the reference print medium based on received reference ink model parameter data. In such an embodiment, the reference ink model parameter data comprises a one-time generation of ink model parameter data for the reference print medium.

In one embodiment, ink model parameter data (e.g., reference or unknown) comprises parameter estimates that are generated by applying an ink model, such as a Weibull ink model regression, to describe a functional relationship between OD and ink deposition data. Weibull cumulative distribution function (CDF) describes the probability that a real-valued random variable X with a given probability will be found at a value less than or equal to x (where x is a one possible value of the random variable X). Intuitively, it is the "area under the curve" function of the probability density function (PDF). Cumulative distribution functions are also used to specify the distribution of multivariate random variables. The Weibull CDF model that is employed uses two parameters.

In one embodiment, the Weibull CDF is modified to incorporate paper white and the solid area maximum optical density. This modified Weibull CDF will be described as simply "Weibull CDF". The forward Weibull CDF relates ink deposition to OD, while the inverse Weibull CDF relates OD to ink deposition. In one embodiment, ink deposition is represented by:

$$\text{Ink Deposition} = \frac{\text{Total Ink Mass}}{\text{Area}},$$

$$\text{Total Ink Mass} = \sum_{Area} \text{Drop sizes}$$

In one embodiment, a four parameter Weibull ink model is implemented using $OD=(p(3)*(1-\exp^{((-(x/p(1))^{\wedge}p(2))))}+p$ (4). In such an embodiment, the two-parameter classical Weibull CDF function has been extended to four parameters to create an ink model. The two additional parameters allow the model to account for paper white and absolute paper referenced OD, where x=ink deposition mass per area, p(1)=ink mass per area scale factor, which is similar to the classical Weibull scale factor, and p(2)=slope factor.

This factor influences the shape of the function similarly to the classical Weibull slope factor, p(3)=maximum paper referenced OD and p(4)=paper white OD. Factors p(1) and p(2) are the parameters used in the classical two parameter Weibull CDF function. The p(1) scale factor adjusts the shape of the curve to modify how much ink deposition is required to achieve various ODs. Larger values for p(1) require more ink deposition to achieve the same OD.

In addition, since p(1) is similar to two-parameter classical Weibull slope, it indicates the point of the curve where the ink deposition corresponds to the OD level approximately 63% between the range defined by the paper referenced OD, parameter p(3) and the OD defined by p(4). The model provides a value for the maximum absolute OD for the ink/paper. This maximum OD will be given by the sum of the p(3) and p(4) parameters. This maximum OD would occur at infinite ink deposition.

Based on the Weibull CDF parameters, OD ink response data may be generated using uncalibrated ink deposition data. In other embodiments, the response data may be represented using CIE L*a*b* rather than OD. In such an embodiment, CIE L*a*b* is implemented to provide Delta E calculations, Alternate ink models, like the Weibull model described previously, can be used to describe the relationship between CIE L*a*b* and ink deposition. For example L* versus ink deposition can use the same equation, by modifying the definitions for p(3) and p(4) to use L* values instead of OD. The alternate model predicts decreased L* values with increased ink deposition x. A polynomial function, alone or combined with a Weibull like equation, can be used to describe a* and b* vs ink deposition.

Uncalibrated OD measurement data comprises OD response data measured from a print medium. In one embodiment, the OD response data comprises an OD versus digital count, where digital count is the gray level representing the pels in the bitmap 150. Uncalibrated ink deposition (or ink deposition) is defined as an average amount of ink deposited per printed device pel, where a pel is a picture element of the printer 160 (e.g., the printing device).

In a further embodiment, the amount of ink deposition changes as a function of digital count. In such an embodiment, the pels in bitmap 150 range from 0-255 for a typical 8-bit system. Additionally, the digital count is a control parameter of an output pel. In yet a further embodiment, an ink deposition curve is the ink deposition (e.g., amount of ink per area) defined over the range of all possible gray levels (e.g., 0-255). In such an embodiment, ink deposition is computed on an average basis to eliminate local variations due to halftoning using a set of discrete drop sizes. An area equal to the printed size of the halftone threshold array is a good region to use for the area calculation, since it defines the size of the fundamental halftone patterns. Ink drop sizes may be determined by analyzing the amount of ink used and counts of ink drops of each size, as will be discussed in more detail below.

According to one embodiment, the reference ink model parameter data may be generated from an uncalibrated OD measurement data for the reference medium and an uncalibrated ink deposition may be generated from measured drop sizes and halftone drop fractions generated for test print jobs (e.g., printed and measured at printing system 130, or another printing system)

Once the reference ink model parameter data has been received at ink model logic 220, the reference print medium is installed, and one or more test print jobs may be printed, at printing system 130. As a result, measurement module 190 measures uncalibrated OD measurement data of test data printed to the reference print medium. The uncalibrated OD measurement data for the reference print medium may then be received at ink model logic 220.

Uncalibrated ink deposition data for the reference print medium is generated based on the reference ink model parameter data and the uncalibrated OD measurement data for the reference print medium (see details further below). Subsequently, the process may be repeated with an unknown print medium being installed at printing system 130, and one or more test print jobs being printed to the unknown print medium.

Again, measurement module 190 measures uncalibrated OD measurement data for printed test data, this time for the unknown print medium. The uncalibrated OD measurement data for the unknown print medium may then be received at ink model logic 220. In one embodiment, ink model generation logic 320 generates the ink model parameter data (e.g., via the Weibull ink model regression) for the unknown print medium based on uncalibrated ink deposition data for the reference print medium using inverse Weibull ink model and the uncalibrated optical density (OD) measurement data for the unknown print medium.

Figure 4:
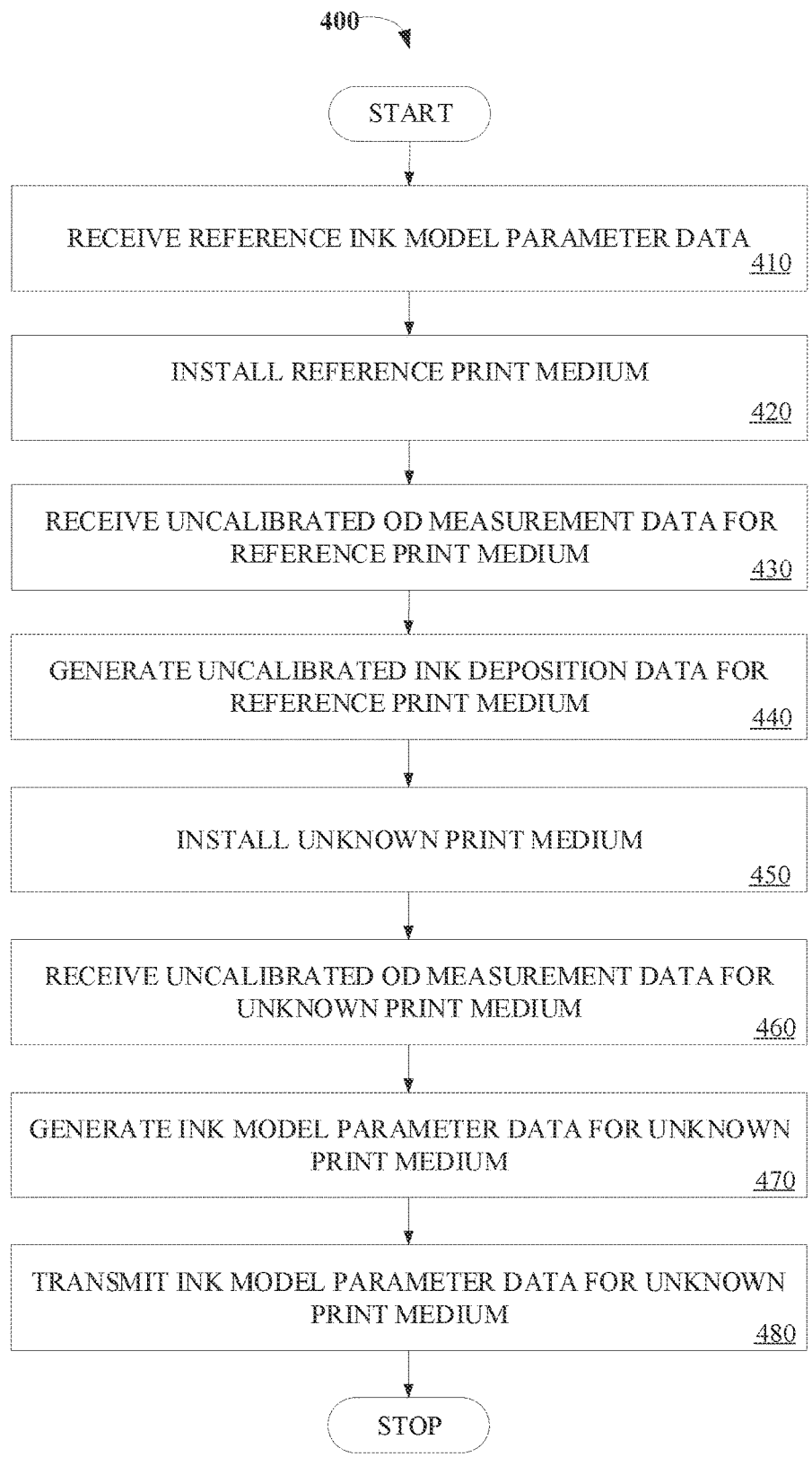
FIG. 4 is a flow diagram illustrating one embodiment of an ink model computation process.

FIG. 4 is a flow diagram illustrating one embodiment of a process 400 for performing an ink model computation. Process 400 may be performed by processing logic that may include hardware (e.g., circuitry, dedicated logic, programmable logic, microcode, etc.), software such as instructions run on a processing device, or a combination thereof. In one embodiment, process 400 is performed by ink model logic 220.

According to one embodiment, process 400 begins at processing block 410, where ink model parameter data is received for the reference print medium. At processing block 420, the reference print medium is installed at printing system 130, where one or more test print jobs are printed on the reference print medium. At processing block 430, uncalibrated OD measurement data is received for the test print jobs printed on the reference medium (e.g., form measurement module 190).

At processing block 440, uncalibrated ink deposition data is generated for the reference print medium, based on the OD measurement data for the reference print medium and inverse ink model for the reference print medium. At processing block 450, an unknown print medium is installed at printing system 130, where one or more test print jobs are printed on the unknown print medium.

At processing block 460, uncalibrated OD measurement data is received for the test print jobs printed on the unknown medium. At processing block 470, ink model parameter data for the unknown print medium is generated based on the OD measurement data for the unknown medium and the ink deposition data for the reference print medium by using the inverse ink model for the reference print medium. At processing block 480, the ink model parameter data for the unknown print medium is transmitted. It should be understood that measurements and ink depositions for like digital count values are used to obtain matching sets of data to generate the ink model parameters for the unknown medium. By performing this, ink model parameter data for the unknown print medium has been determined efficiently and with minimal system resources. Ink model parameter data may be used to determine ink drop sizes and/or ink usage estimation in a print system 130.

Figure 5:
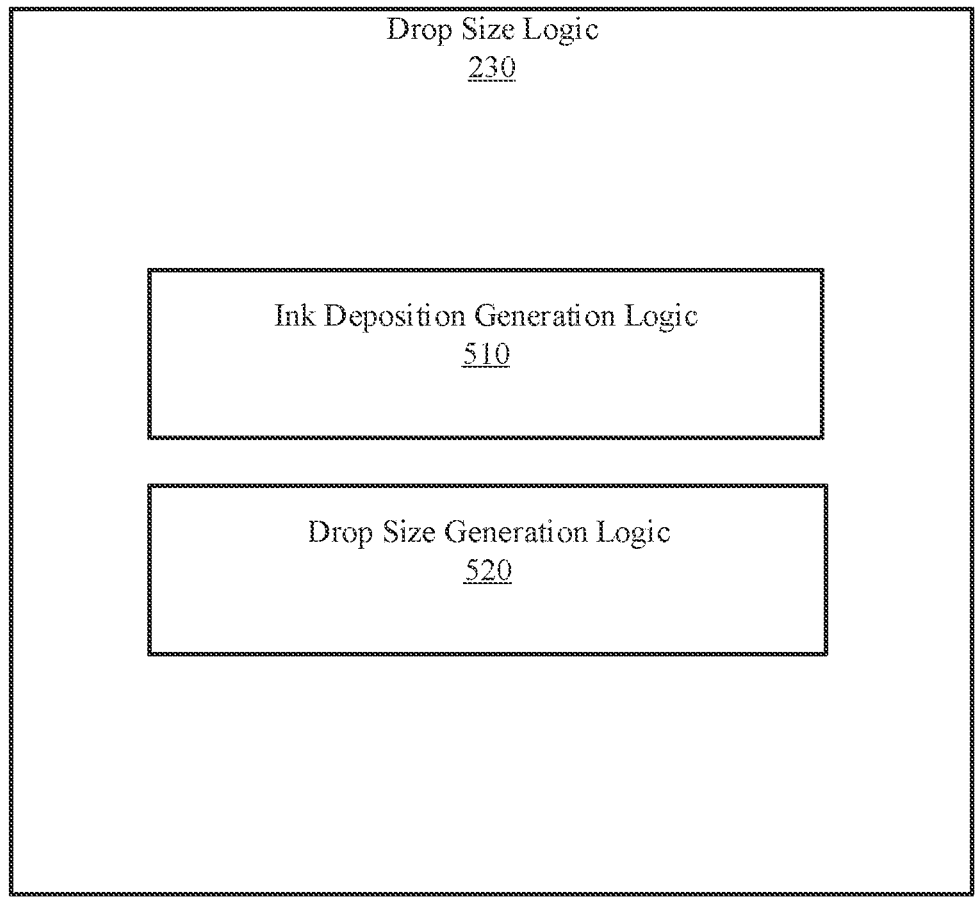
FIG. 5 illustrates one embodiment of drop size logic.

Referring back to FIGS. 2A-2C, drop size logic 230 is implemented to generate ink drop sizes for printing system 130. In one embodiment, drop size logic 230 uses the ink model parameter data received from ink model logic 220 to generate the drop size data. FIG. 5 illustrates one embodiment of drop size logic 230, including ink deposition generation logic 510 and drop size generation logic 520.

Ink deposition generation logic 510 generates uncalibrated ink deposition data using (or based on) ink model parameter data and uncalibrated OD measurement data. In one embodiment, the uncalibrated OD measurement data is associated with OD measurements generated to calibrate print heads 162 of printer 160 (FIG. 1). In a further embodiment, the uncalibrated ink deposition data is generated using an inverse of the Weibull ink model (or inverse ink model).

As discussed above, the Weibull ink model refers to OD and ink depositions using measured drop sizes e.g., OD=W(i)=M(ID$^{-1}$(i)), where W is the Ink Model W(i) as a function of ink deposition i, M(g) is the Measured OD as a function of gray level g and ID is the uncalibrated ink deposition as a function of gray level. Thus, the inverse Weibull may be used to determine the uncalibrated ink deposition from the uncalibrated OD vs gray level g (e.g., W$^{-1}$(OD)=ID(M$^{-1}$(OD)). This defines both the OD and Ink deposition ID relationships versus gray level, whereas the ink model does not include this relationship.

It should be clear that while the ink model is referred to as a Weibull ink model, the ink model can be any functional relationship which relates OD to ink deposition for a printer. The inverse ink model being an inverse relationship requires a single value to provide a one to one relationship between ink deposition and OD. This one to one relationship for inverse functions is commonly described by the horizontal line test.

In our application to derive the ink model for an unknown paper, we have $W_1^{-1}$(OD)=ID$_1$(g). This employs the inverse of the ink model $W_1$ for the reference paper to generate a function vs gray level g to describe the ink deposition ID$_1$ for the reference paper. Measuring OD as a function of gray level g using the unknown paper to establish M$_2$, we then can derive an ink model W$_2$ for the unknown paper using the relationship $W_2$(i)=$M_2$(ID$_1^{-1}$(i)). This produces a function W$_2$, which describes the ink model for the unknown paper. Again, since we have inverse functions, we must require them to pass the horizontal line test to ensure that a one to one relationship exists. In the case of the Ink deposition function ID this is generally guaranteed by the halftone design which requires the stacking condition that always has a larger drop size for every pel as the gray level is increased. This produces a monotonically increasing level of ink deposition for increasing gray level which is known to meet the horizontal line test.

Drop size generation logic 520 generates drop size data based on the uncalibrated ink deposition data at ink deposition generation logic 510. According to one embodiment, drop size generation logic 520 uses the uncalibrated ink deposition (or UID) data and ink drop count data (e.g., uncalibrated drop fractions) to generate the drop size data. Ink drop count data comprises a number of drops that occur at each of the plurality of gray levels. Uncalibrated drop fractions may be received by drop size logic 230. Drop fractions represent the ratio of number of drops for a given drop size, relative to the total number of possible drops of all sizes. Drop fractions are expressed as a function vs gray level.

Figure 6:
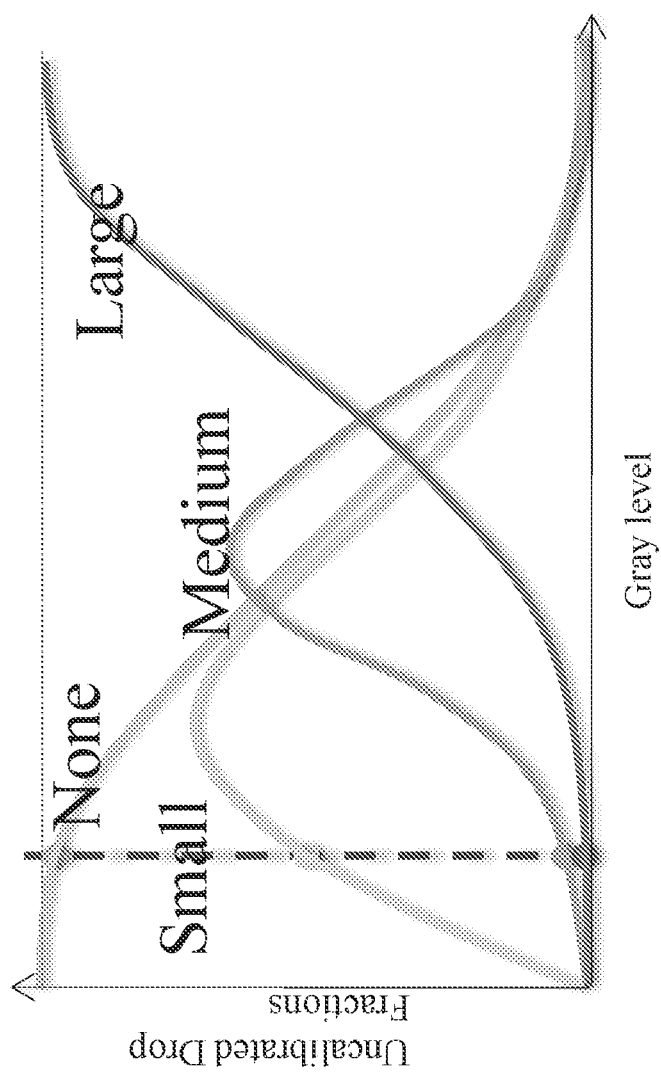
FIG. 6 illustrates one embodiment of a graph of uncalibrated drop fractions as a function of gray level.

FIG. 6 illustrates one embodiment of a graph of uncalibrated drop fractions as a function of gray level for a four-drop size halftone, where the drop fraction range is between zero and one. The drop fractions for each individual drop size, including none, must always sum to a value of one since drops must be one of four different drop sizes.

In one embodiment, the uncalibrated drop fraction data is generated based on analysis of an uncalibrated halftone. A calibrated halftone is a halftone that has been adjusted to achieve a target response and so an uncalibrated halftone has not been adjusted to achieve a target response. Uncalibrated drop fractions represent percentages of a halftone threshold array for a specific drop size at each digital count (DC) level, where digital count is the gray level representing the pels in the bitmap 150, which ranges from 0-255 for a typical 8 bit system. DC is a print system input control and print system input control may be represented as DC, percent dot, or gray level.

To determine the uncalibrated drop fractions, an uncalibrated multibit threshold array may be analyzed to determine a number of drops (e.g., drop count) that occur at each DC or gray level. Thus, uncalibrated drop fractions are the number of drops in the threshold array for one drop size (e.g., small, medium, large and none) divided by the total number of drops for the one drop size in the threshold array, which is determined for each different drop size at each DC level.

The total number of drops for a single drop size is defined by the size of the threshold array. The total number of drops for a single drop size is the product of the number of rows and the number of columns in the threshold array. For example, at DC level 100, if we have 10000 small drops and the array is 256×256, the uncalibrated small drop fraction is 10000/(256*256) or 0.153. The uncalibrated drop fraction for the none drop size is not necessary to compute. It can be used for verification since the sum of all uncalibrated drop fractions including none must be equal to one (100%). Uncalibrated drop fraction may be determined for each color plane based on the uncalibrated multibit threshold corresponding to each color plane.

In one embodiment, UID=W$^{-1}$(OD_measured), provided inverse Weibull function=W$^{-1}$; measured OD=OD_measured; unknown drop sizes=DS_small, DS_medium and DS_large; Gray level=g; and uncalibrated drop fractions for small, medium and large drops: UDF_small(g), UDF_medium(g), and UDF_large(g). In a further embodiment, the ink model and the OD measurement data are for matching conditions. In other words, the ink model used must be for the same paper, halftone and ink set that was used to measure the OD. Ink models described previously for a reference print medium or unknown print medium may be used. Thus, assuming a four-drop size system (e.g., none, small, medium and large):

Ink deposition per pel=(UDF_small(g)*DS_small)+(UDF_medium(g)*DS_medium)+(UDF_large(g)*DS_large); and Ink deposition per area=Ink deposition per pel/Area of pel Based on the above, drop size generation logic 520 determines best fit drop sizes to obtain an ink deposition per area that equals the uncalibrated ink deposition. In one embodiment, generation logic 520 determines the best fit drop sizes by performing a drop size regression. In such an embodiment, a least squares regression process is performed to solve the set of linear equations and obtain the unknown drop sizes.

Using the regression process, ink depositions are determined for each gray level. Based on a set of 256 (e.g., 0-255) simultaneous linear equations of uncalibrated ink deposition values, three equations are implemented to define three unknown drop sizes. Thus, approximately eighty-five (e.g., (256/3) sets of three different drop sizes may be determined, enabling an understanding of how drop sizes change across the tonal range (e.g., assuming an 8-bit halftone). Employing higher bit depth halftones permits obtaining a larger set of drop size estimates by employing the regression process for each pattern of the halftone. For example, a 14 bit halftone enables deriving drop sizes at each gray level for an 8 bit imaging path.

In yet a further embodiment, drop size generation logic 520 is also implemented to determine drop sizes for printer characteristics other than gray levels since drop sizes may vary depending on such conditions. In such an embodiment, drop size generation logic 520 may determine drop sizes for printer characteristics of print system 130, such as patch sizes, printhead voltages (PHV), printhead temperatures, jetting frequencies, number of jetting nozzles, other system temperatures, and/or etc.

Figure 7:
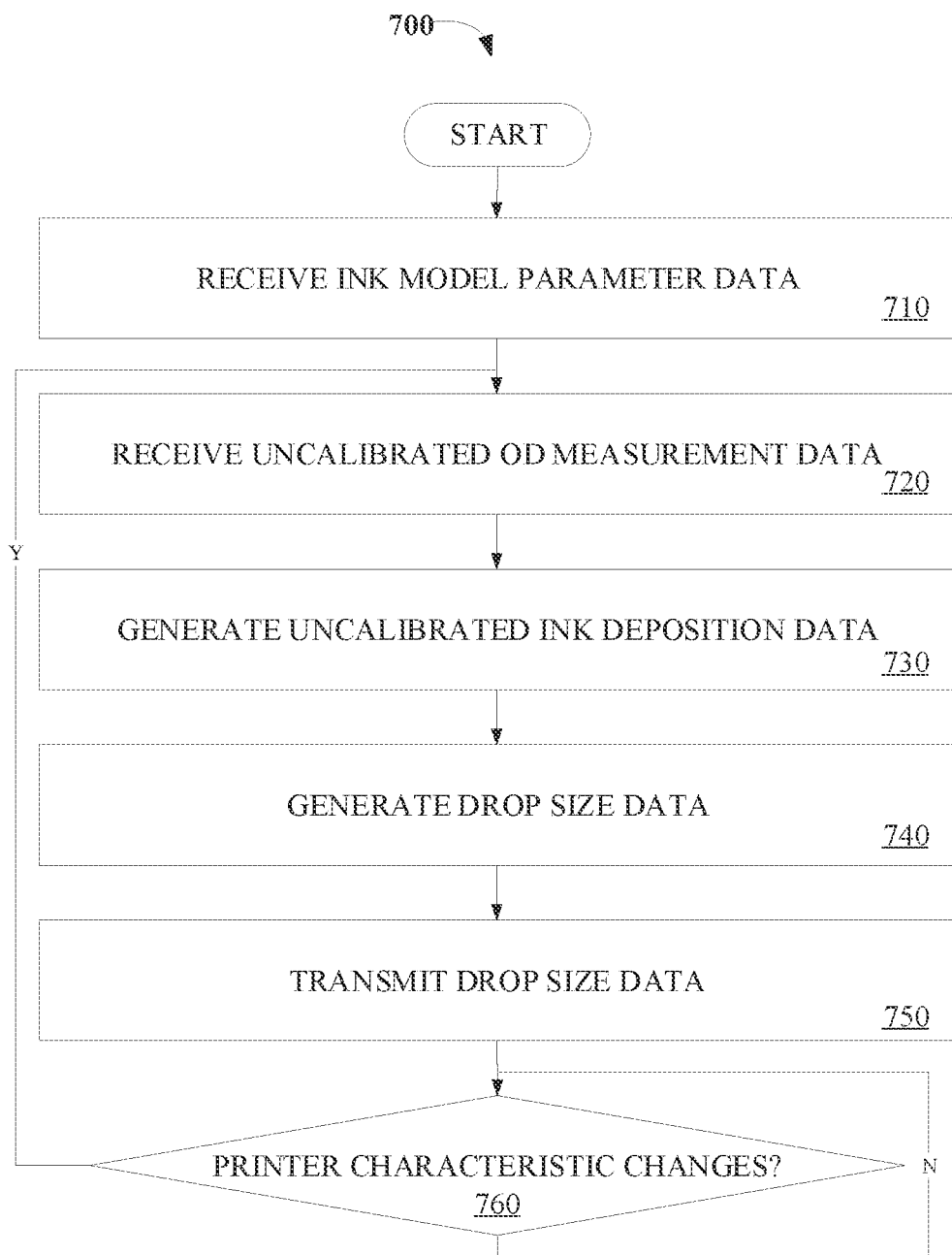
FIG. 7 is a flow diagram illustrating one embodiment of a drop size computation process.

FIG. 7 is a flow diagram illustrating one embodiment of a process 700 for performing a drop size computation. Process 700 may be performed by processing logic that may include hardware (e.g., circuitry, dedicated logic, programmable logic, microcode, etc.), software such as instructions run on a processing device, or a combination thereof. In one embodiment, process 700 is performed by drop size logic 230.

According to one embodiment, process 700 begins at processing block 710, where ink model parameter data is received. As discussed above, the ink model parameter data may be received from ink model logic 220. At processing block 720, the uncalibrated OD measurement data is received. In one embodiment, the uncalibrated OD measurement data is generated by print engine calibration.

At processing block 730, uncalibrated ink deposition data is generated using the uncalibrated OD measurement data and ink model parameter data (e.g., via inverse Weibull). At processing block 740, the drop size data is generated based on the uncalibrated ink deposition data (e.g., via a regression using drop fractions). At processing block 750, the drop size data is transmitted. In one embodiment, the transmitted drop size data may be displayed at a graphical user interface (GUI) 250 at print controller 140.

At decision block 760, a determination is made as to whether one or more changes to characteristics of print system 130 has been detected. If so, control is returned to processing block 720 where the process is repeated for updated uncalibrated OD measurement data generated in response to the change in the print system 130 characteristics. Otherwise, control remains at decision block 760 until a change to characteristics of print system 130 has been detected.

Referring to FIGS. 2A-2C, ink estimation logic 240 is implemented to provide an estimation of ink that is to be used to produce a print job. In such an embodiment, ink estimation logic 220 generates estimated ink usage data by computing a sum of ink usage data for each of a plurality of drop sizes generated by each pel forming element 165. In a further embodiment, ink estimation logic 220 uses histograms generated for each color plane (e.g., CMYK), as well as the drop size data and drop fractions, to estimate the print job ink usage. By performing this, ink drop size and/or ink estimation is determined accurately, efficiently and with minimal system resources. Ink drop size data may be used to evaluate and determine ink usage estimation in a print system 130.

Figure 8:
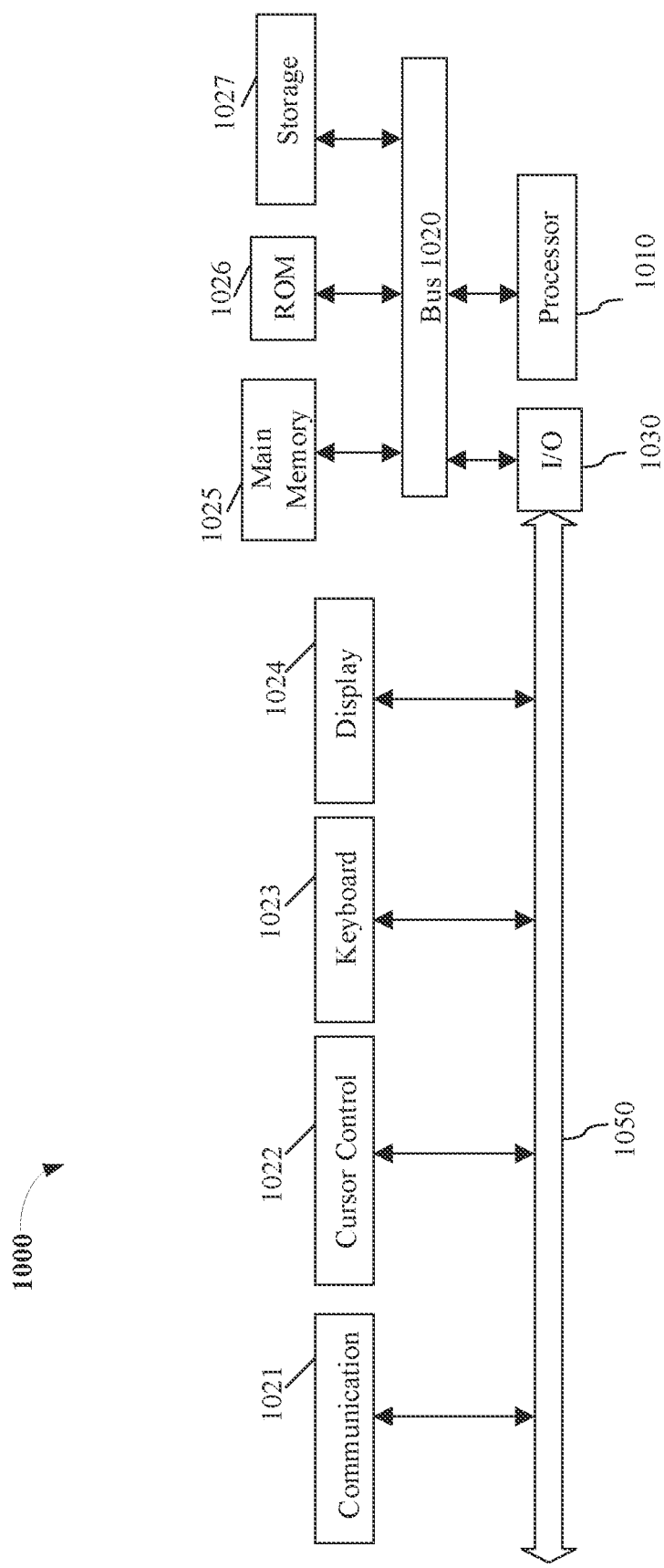
FIG. 8 illustrates one embodiment of a computer system.

FIG. 8 illustrates a computer system 1000 on which printing system 130, print controller 140, ink model logic 220, drop size logic 230 and/or ink estimation logic 240 may be implemented. Computer system 1000 includes a system bus 1020 for communicating information, and a processor 1010 coupled to bus 1020 for processing information.

Computer system 1000 further comprises a random access memory (RAM) or other dynamic storage device 1025 (referred to herein as main memory), coupled to bus 1020 for storing information and instructions to be executed by processor 1010. Main memory 1025 also may be used for storing temporary variables or other intermediate information during execution of instructions by processor 1010. Computer system 1000 also may include a read only memory (ROM) and or other static storage device 1026 coupled to bus 1020 for storing static information and instructions used by processor 1010.

A data storage device 1027 such as a magnetic disk or optical disc and its corresponding drive may also be coupled to computer system 1000 for storing information and instructions. Computer system 1000 can also be coupled to a second I/O bus 1050 via an I/O interface 1030. A plurality of I/O devices may be coupled to I/O bus 1050, including a display device 1024, an input device (e.g., an alphanumeric input device 1023 and or a cursor control device 1022). The communication device 1021 is for accessing other computers (servers or clients). The communication device 1021 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a system comprising at least one physical memory device to store drop size logic and one or more processors coupled with the at least one physical memory device to execute the drop size logic to generate drop size data associated with a printing system based on ink deposition data for a print medium and ink drop count data.

Example 2 includes the subject matter of Example 1, wherein the drop size data is generated by performing a drop size regression.

Example 3 includes the subject matter of Examples 1 and 2, wherein the drop size regression determines a best fit of drop sizes for a plurality of gray levels to determine an ink deposition per area equal to the ink deposition data.

Example 4 includes the subject matter of Examples 1-3, wherein the ink drop count data comprises a number of drops that occur at each of the plurality of gray levels.

Example 5 includes the subject matter of Examples 1-4, wherein generating the ink deposition data comprises applying an inverse of ink model parameter data to an optical density data.

Example 6 includes the subject matter of Examples 1-5, wherein the drop size data is generated based on a plurality of print system characteristics.

Example 7 includes the subject matter of Examples 1-6, wherein the print system characteristics comprise at least one of gray levels, patch sizes, printhead voltage and printhead temperature.

Example 8 includes the subject matter of Examples 1-7, wherein the ink estimation logic further transmits the drop size data.

Example 9 includes the subject matter of Examples 1-8, further comprising a graphical user interface to display the drop size data.

Some embodiments pertain to Example 10 that includes a method comprising generating drop size data associated with a printing system based on ink deposition data for a print medium and ink drop count data.

Example 11 includes the subject matter of Example 10, wherein the drop size regression determines a best fit of drop sizes for a plurality of gray levels to determine an ink deposition per area equal to the ink deposition data.

Example 12 includes the subject matter of Examples 10 and 11, wherein the ink drop count data comprises a number of drops that occur at each of the plurality of gray levels.

Example 13 includes the subject matter of Examples 10-12, wherein generating the ink deposition data comprises applying an inverse of ink model parameter data to an optical density data.

Example 14 includes the subject matter of Examples 10-13, wherein the drop size data is generated based on a plurality of print system characteristics.

Example 15 includes the subject matter of Examples 10-14, wherein the print system characteristics comprise at least one of gray levels, patch sizes, printhead voltage and printhead temperature.

Some embodiments pertain to Example 16 that includes at least one computer readable medium having instructions stored thereon, which when executed by one or more processors, cause the processors to generate drop size data associated with a printing system based on ink deposition data for a print medium and ink drop count data.

Example 17 includes the subject matter of Example 16, wherein the drop size data is generated by performing a drop size regression.

Example 18 includes the subject matter of Examples 16 and 17, wherein the drop size regression determines a best fit of drop sizes for a plurality of gray levels to determine an ink deposition per area equal to the ink deposition data.

Example 19 includes the subject matter of Examples 16-18, wherein the ink drop count data comprises a number of drops that occur at each of the plurality of gray levels.

Example 20 includes the subject matter of Examples 16-19, wherein generating the ink deposition data comprises applying an inverse of ink model parameter data to an optical density data.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:
   at least one physical memory device to store drop size logic; and
   one or more processors coupled with the at least one physical memory device to execute the drop size logic to generate drop size data associated with a printing system based on ink deposition data for a print medium and ink drop count data, wherein the drop size data comprises ink drop sizes ejected by the printing system onto the print medium for each of a plurality of gray levels and is generated by performing a drop size regression that determines a best fit of drop sizes for the plurality of gray levels to determine an ink deposition per area equal to the ink deposition data.

2. The system of claim 1, wherein the ink drop count data comprises a number of drops that occur at each of the plurality of gray levels.

3. The system of claim 1, wherein generating the ink deposition data comprises applying an inverse of ink model parameter data to an optical density data.

4. The system of claim 1, wherein the drop size data is generated based on a plurality of print system characteristics.

5. The system of claim 4, wherein the print system characteristics comprise at least one of gray levels, patch sizes, printhead voltage and printhead temperature.

6. The system of claim 1, wherein the drop size logic further transmits the drop size data.

7. A method comprising:
   generating drop size data associated with a printing system based on ink deposition data for a print medium and ink drop count data, wherein the drop size data comprises ink drop sizes ejected by the printing system onto the print medium for each of a plurality of gray levels and is generated by performing a drop size regression that determines a best fit of drop sizes for the plurality of gray levels to determine an ink deposition per area equal to the ink deposition data.

8. The method of claim 7, further comprising transmitting the drop size data.

9. The method of claim 7, wherein the ink drop count data comprises a number of drops that occur at each of the plurality of gray levels.

10. The method of claim 7, wherein generating the ink deposition data comprises applying an inverse of ink model parameter data to an optical density data.

11. The method of claim 7, wherein the drop size data is generated based on a plurality of print system characteristics.

12. The method of claim 11, wherein the print system characteristics comprise at least one of gray levels, patch sizes, printhead voltage and printhead temperature.

13. At least one non-transitory computer readable medium having instructions stored thereon, which when executed by one or more processors, cause the processors to:
  generate drop size data associated with a printing system based on ink deposition data for a print medium and ink drop count data, wherein the drop size data comprises ink drop sizes ejected by the printing system onto the print medium for each of a plurality of gray levels and is generated by performing a drop size regression that determines a best fit of drop sizes for the plurality of gray levels to determine an ink deposition per area equal to the ink deposition data.

14. The computer readable medium of claim 13, having instructions stored thereon, which when executed by one or more processors, further cause the processors to transmit the drop size data.

15. The computer readable medium of claim 13, wherein the ink drop count data comprises a number of drops that occur at each of the plurality of gray levels.

16. The computer readable medium of claim 15, wherein generating the ink deposition data comprises applying an inverse of ink model parameter data to an optical density data.

* * * * *